US012767078B2

(12) United States Patent
Cuenca Mejia et al.

(10) Patent No.: US 12,767,078 B2
(45) Date of Patent: Oct. 20, 2026

(54) VEHICLE INCLUDING FRONT BUMPER AND HEADLAMP ASSEMBLY

(71) Applicant: NISSAN NORTH AMERICA, INC., Franklin, TN (US)

(72) Inventors: Rafael Cuenca Mejia, Toluca (MX); Freddy Miranda Mejia, Toluca (MX)

(73) Assignee: NISSAN NORTH AMERICA, INC., Franklin, TN (US)

( * ) Notice: Subject to any disclaimer, the term of this patent is extended or adjusted under 35 U.S.C. 154(b) by 0 days.

(21) Appl. No.: 19/056,044

(22) Filed: Feb. 18, 2025

(65) Prior Publication Data

US 2026/0241883 A1 Aug. 20, 2026

(51) Int. Cl.
*B60R 19/50* (2006.01)
*B60Q 1/04* (2006.01)

(52) U.S. Cl.
CPC ............ *B60R 19/50* (2013.01); *B60Q 1/0483* (2013.01); *B60R 2019/505* (2013.01)

(58) Field of Classification Search
CPC ............ B60Q 1/0483; B60R 2019/505; B60R 19/50
See application file for complete search history.

(56) References Cited

U.S. PATENT DOCUMENTS

| | | | | |
|---|---|---|---|---|
| 4,563,028 A * | 1/1986 | Ogawa | B60R 19/18 293/122 |
| 6,547,427 B1 * | 4/2003 | Cheron | B60Q 1/076 362/369 |
| 7,014,254 B2 * | 3/2006 | Rijsbergen | B60Q 1/2638 362/544 |
| 2009/0218834 A1 * | 9/2009 | Huber | B60Q 1/0433 293/155 |
| 2010/0032971 A1 * | 2/2010 | Stoffel | B60R 19/50 293/155 |

FOREIGN PATENT DOCUMENTS

| | | | |
|---|---|---|---|
| CA | 3137625 A1 * | 1/2022 | F21S 43/26 |
| JP | 2005082036 A * | 3/2005 | B60R 19/50 |
| JP | 2017200783 A * | 11/2017 | B60Q 1/0491 |
| WO | WO-2011131878 A1 * | 10/2011 | B60J 5/045 |

(Continued)

OTHER PUBLICATIONS

English Machine Translation of WO 2011131878 (Year: 2011).*

(Continued)

*Primary Examiner* — Zheng Song
(74) *Attorney, Agent, or Firm* — Spencer Fane, LLP

(57) ABSTRACT

A vehicle equipped with a bumper and headlamp assembly is disclosed herein. In an embodiment, the vehicle includes a headlamp assembly and a front bumper. The headlamp assembly is a single structure having a first side housing a first lamp and a second side housing a second lamp. The front bumper is located on the front side of the vehicle frame and includes at least a first aperture with a border formed by an overlay strip. The front bumper is attached over the headlamp assembly so that the first lamp emits light through the first aperture on one side of the overlay strip, the second lamp emits light on another side of the overlay strip, and the overlay strip overlaps a portion of the headlamp assembly between the first side and the second side.

20 Claims, 6 Drawing Sheets

(56) References Cited

FOREIGN PATENT DOCUMENTS

| | | | | | |
|---|---|---|---|---|---|
| WO | WO-2013018409 | A1 | * | 2/2013 | ............... B60Q 1/20 |
| WO | WO-2020079339 | A1 | * | 4/2020 | ............. B60R 19/50 |
| WO | WO-2024128289 | A1 | * | 6/2024 | ............ F21S 43/249 |
| WO | WO-2024149539 | A1 | * | 7/2024 | .......... F21S 41/2805 |
| WO | WO-2025130761 | A1 | * | 6/2025 | ............ F21S 41/141 |

OTHER PUBLICATIONS

English Machine Translation of JP 2005082036 (Year: 2005).*
English Translation of WO 2024149539 provided by Google (Year: 2024).*

* cited by examiner

VEHICLE INCLUDING FRONT BUMPER AND HEADLAMP ASSEMBLY

BACKGROUND

Field of the Disclosure

The present disclosure generally relates to a bumper and headlamp assembly for a vehicle.

Background Information

Front bumpers and headlamps are integral parts of a typical vehicle design. Front bumpers provide a protective component which absorbs or lessens the impact of collisions. Headlamps provide lighting systems for driving at night or in poor visibility conditions and for signaling turns, parking, etc. Front bumpers and headlamps are thus critical components of vehicle functionality and safety, while also contributing to a vehicle's overall aesthetic appearance.

SUMMARY

The present disclosure provides a front bumper and headlamp assembly that reduces the number of parts required while still giving the appearance of multiple headlamps on each side of a vehicle. The disclosed assembly also adds stability to the front bumper, which attaches directly to the headlamp assembly to avoid a sagging effect seen in existing vehicles.

In view of the state of the known technology, one aspect of the present disclosure is to provide a vehicle. The vehicle includes a vehicle frame, a headlamp assembly and a front bumper. The headlamp assembly is located on the front side of the vehicle frame and is a single structure having a first side housing a first lamp and a second side housing a second lamp. The front bumper is located on the front side of the vehicle frame and includes at least a first aperture with a border formed by an overlay strip. The front bumper is attached over the headlamp assembly so that the first lamp emits light through the first aperture on one side of the overlay strip, the second lamp emits light on another side of the overlay strip, and the overlay strip overlaps a portion of the headlamp assembly between the first side and the second side.

A second aspect of the present disclosure is to provide another vehicle. The vehicle includes a vehicle frame, a headlamp assembly, at least one bracket and a front bumper. The headlamp assembly is located on the front side of the vehicle frame and is a single structure having a first side housing a first lamp and a second side housing a second lamp. The at least one bracket is attached to the headlamp assembly between the first side and the second side. The front bumper is located on the front side of the vehicle frame and includes at least a first aperture. The front bumper is attached to the at least one bracket such that the first lamp emits light through the first aperture and the second lamp emits light from an area outside of the first aperture.

A third aspect of the present disclosure is to provide another vehicle. The vehicle includes a vehicle frame, a first headlamp assembly, a second headlamp assembly and a front bumper. The vehicle frame has a front side, a driver side and a passenger side. The first headlamp assembly is located on the driver side of the front side of the vehicle frame. The first headlamp assembly is a single structure and has a lower side housing a first lamp and an upper side housing a second lamp. The second headlamp assembly is located on the passenger side of the front side of the vehicle frame. The second headlamp assembly is a single structure and has a lower side housing a third lamp and an upper side housing a fourth lamp. The front bumper is located on the front side of the vehicle frame. The front bumper includes at least a first aperture on the driver side and a second aperture on the passenger side. The front bumper is attached so that the first lamp emits light through the first aperture, the second lamp emits light from above the first aperture, the third lamp emits light through the second aperture, and the fourth lamp emits light from above the second aperture.

A fourth aspect of the present disclosure is to provide a headlamp assembly. The headlamp assembly includes a headlamp housing, a first lamp, a second lamp and at least one blackout layer. The headlamp housing has a first side, a second side, and an outer lens surface with a concave cavity located between the first side and the second side. The first lamp is located within the first side of the headlamp housing. The second lamp is located within the second side of the headlamp housing. The at least one blackout layer is configured to at least partially prevent a light leak from the first lamp into the second side and from the second lamp into the first side.

Other objects, features, aspects and advantages of the systems and methods disclosed herein will become apparent to those skilled in the art from the following detailed description, which, taken in conjunction with the annexed drawings, discloses exemplary embodiments of the disclosed systems and methods.

BRIEF DESCRIPTION OF THE DRAWINGS

Referring now to the attached drawings which form a part of this original disclosure.

DETAILED DESCRIPTION

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
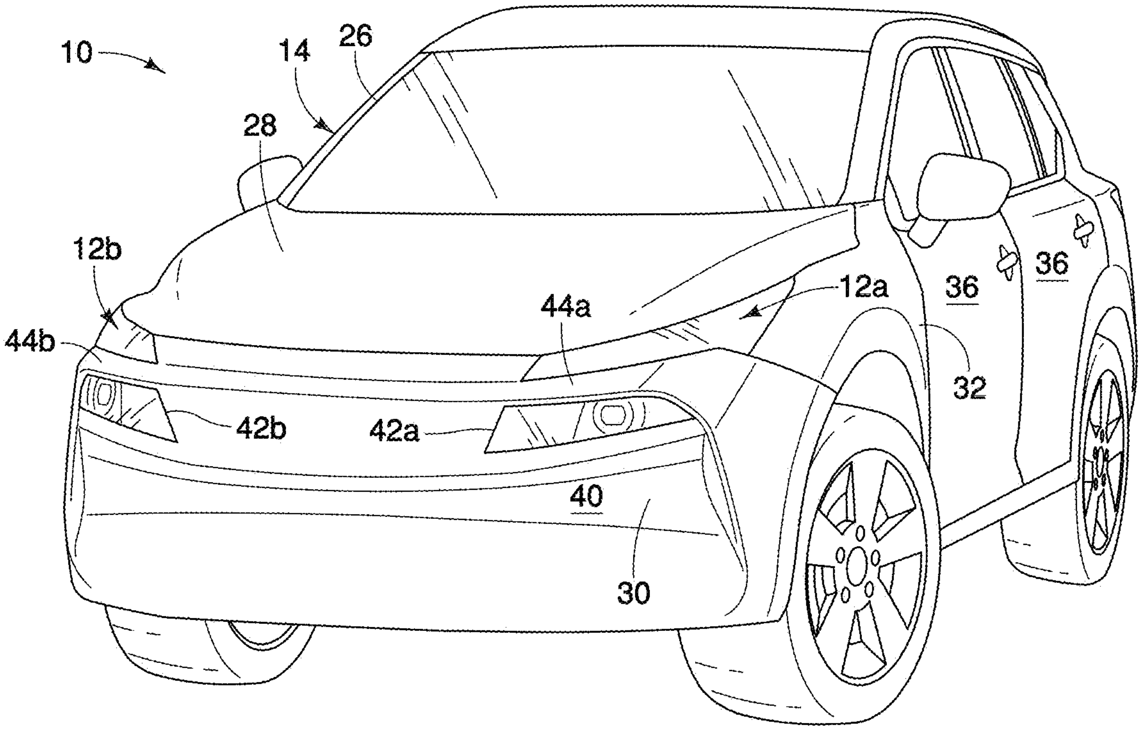
FIG. 1 is a front perspective view of an example embodiment of a vehicle having a front bumper and two headlamp assemblies in accordance with the present disclosure.
Figure 2:
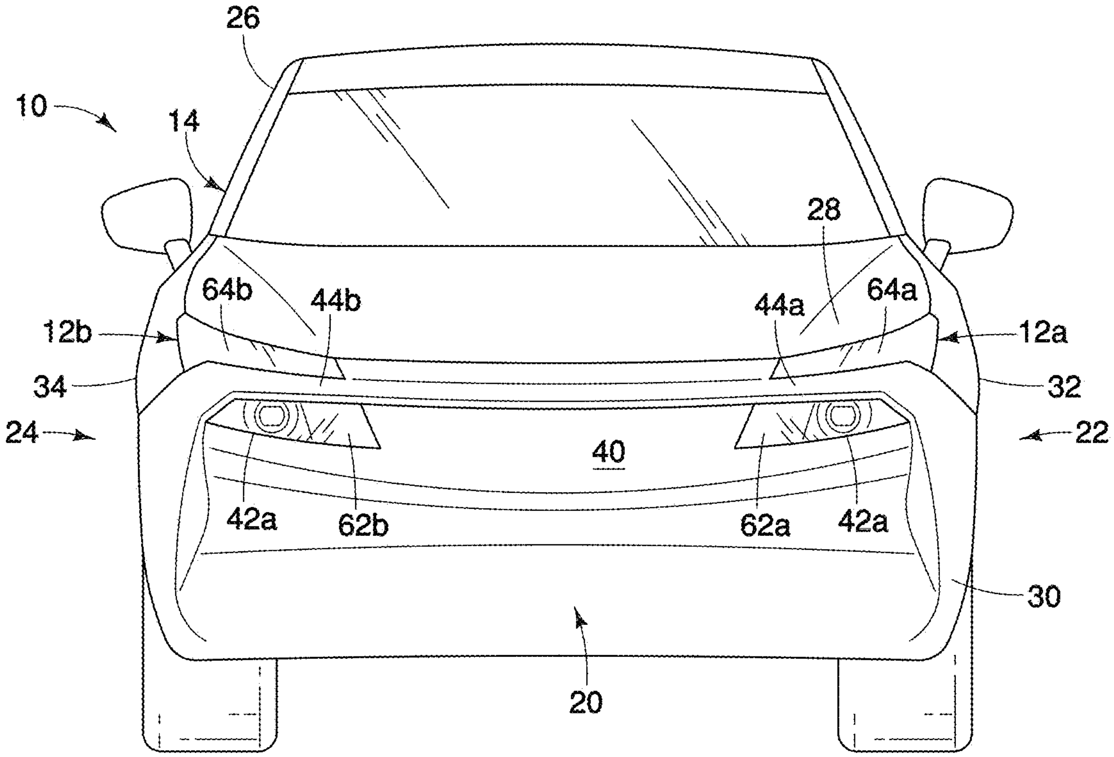
FIG. 2 is a front plan view of the vehicle illustrated in FIG. 1.
Figure 9:
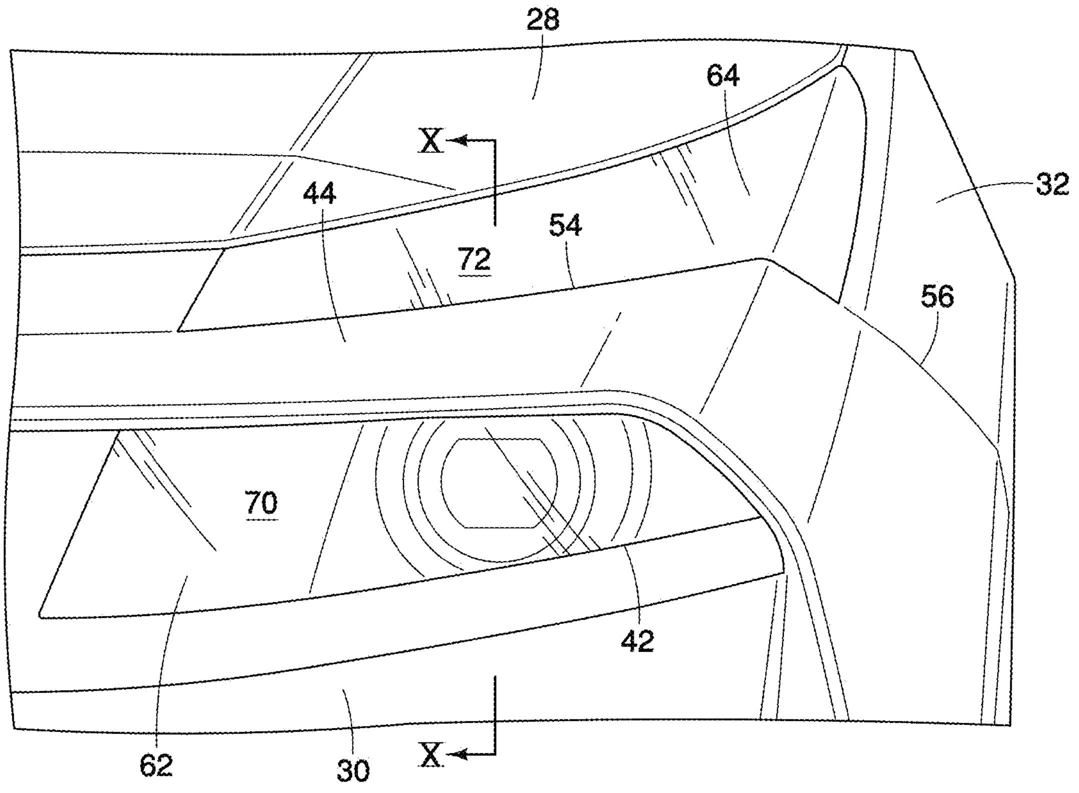
FIG. 9 is a detailed front plan view of the front bumper and driver side headlamp assembly installed on the vehicle of FIG. 1.

FIGS. 1 and 2 illustrate an example embodiment of a vehicle 10 including two headlamp assemblies 12*a*, 12*b* in accordance with the present disclosure. The vehicle 10 generally includes a vehicle frame 14 having a front side 20, a driver side 22 and a passenger side 24. The vehicle frame 14 forms a passenger cabin 26 between the driver side 22 and the passenger side 24. The vehicle 10 further includes a front hood 28 and a front bumper 30 on the front side 20 of the vehicle frame 14, a front driver side panel 32 on the driver side 22 of the vehicle frame 14, a front passenger side panel 34 on the passenger side 24 of the vehicle frame 14, and one or more doors 36 on each side of the passenger cabin 26. The front driver side panel 32 and the front passenger side panel 34 are located on opposite sides of the front hood 28 and the front bumper 30. FIGS. 1 and 2 omit certain parts of the vehicle 10 for simplicity, but those of ordinary skill in the art will recognize from this disclosure that the vehicle 10 can also include other parts such as a front grill 38 (e.g., as seen in FIG. 9), one or more cameras, sensors or fascia, or other parts or structures attached to or near the front bumper 30 as known in the art.

The illustrated vehicle 10 includes a first headlamp assembly 12*a* and a second headlamp assembly 12*b*. The first headlamp assembly 12*a* is located at the driver side 22 of the front side 20 of the vehicle frame 14, and the second headlamp assembly 12*b* is located at the passenger side 24 of the front side 20 of the vehicle frame 14. The first headlamp assembly 12*a* and the second headlamp assembly 12*b* are generally referred to herein as a headlamp assembly 12 with the understanding that the first headlamp assembly 12*a* and its components generally mirror the second headlamp assembly 12*b* and its components.

As seen in FIGS. 1 and 2, the bumper 30 generally includes at an elongated front panel 40 that is a single part extending across the front side 20 of the vehicle 10 from the driver side 22 to the passenger side 24. In the illustrated embodiment, the elongated front panel 40 includes an aperture 42 on each of the driver side 22 and the passenger side 24. That is, the elongated front panel 40 includes a first aperture 42*a* on the driver side 22 and a second aperture 42*b* on the passenger side 24. The elongated front panel 40 further includes at least one overlay strip 44 on each of the driver side 22 and the passenger side 24. That is, the elongated front panel 40 includes a first overlay strip 44*a* on the driver side 22 and a second overlay strip 44*b* on the passenger side 24. The first overlay strip 44*a* is above the first aperture 42*a* and the second overlay strip 44*b* is above the second aperture 42*b*. The first overlay strip 44*a* also forms a border of the first aperture 42*a*, and the second overlay strip 44*b* also forms a border of the second aperture 42*b* (here, the upper edge of the respective aperture 42). As discussed in more detail below, each headlamp assembly 12*a*, 12*b* is positioned and arranged with respect to the front bumper 30 so that light is emitted both through the respective aperture 42 on one side of the overlay strip 44 (e.g., the lower side) and is also emitted on the other side of the overlay strip 44 (e.g., the upper side), with each overlay strip 44 overlapping a portion of the respective headlamp assembly 12*a*, 12*b* between the upper and lower sides.

Figure 3:
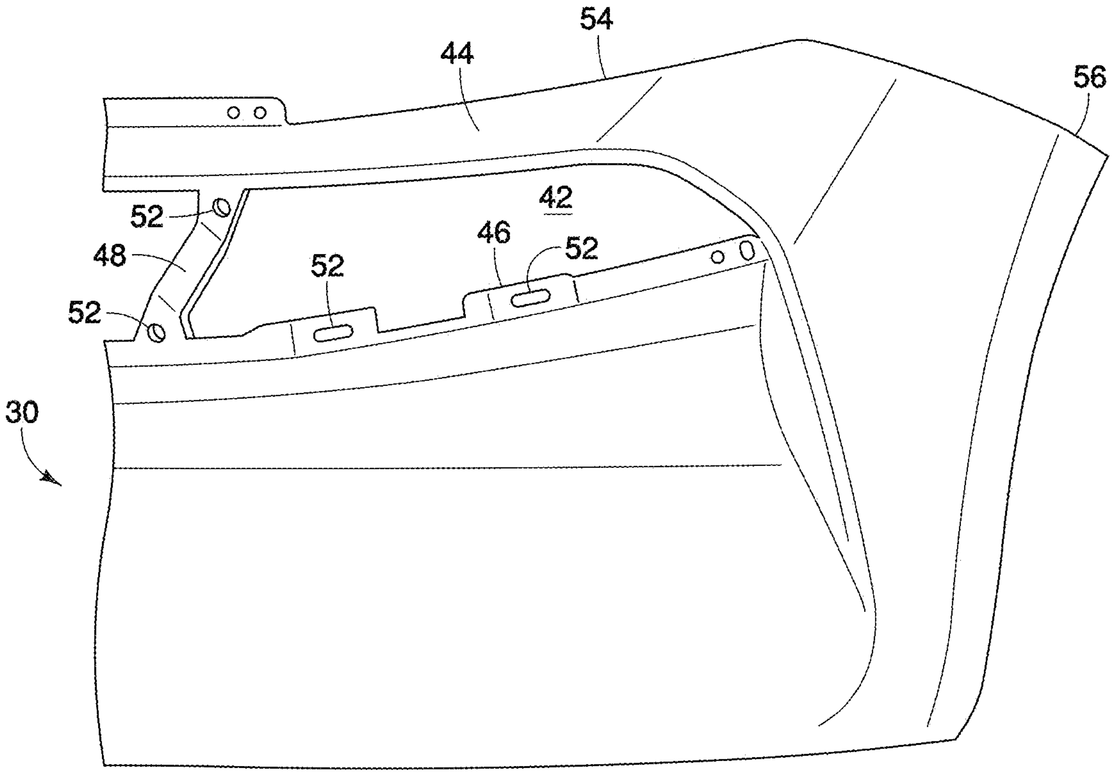
FIG. 3 is a detailed front plan view showing part of the front bumper illustrated in FIG. 1.

FIG. 3 shows part of the front bumper 30 on the driver side 22 in more detail. As seen in FIG. 3, the front bumper 30 includes a first edge 46 forming a lower edge of the aperture 42 and a second edge 48 forming an inner edge of the aperture 42. The first edge 46 and the second edge 48 each include attachment apertures 52 which can be used to attach the front bumper 30 to the headlamp assembly 12. In the illustrated embodiment, the second edge 48 is formed by a support bar connecting the overlay strip 44 to the rest of the elongated front panel 40. The overlay strip 44 also includes an upper edge 54, which snap fits into the headlamp assembly 12 as discussed in more detail below. The front bumper 30 further includes a side edge 56 that borders the front driver side panel 32 on the driver side 22 of the vehicle frame 14 (or the front passenger side panel 34 on the passenger side 24 of the vehicle frame 14).

Figure 4:
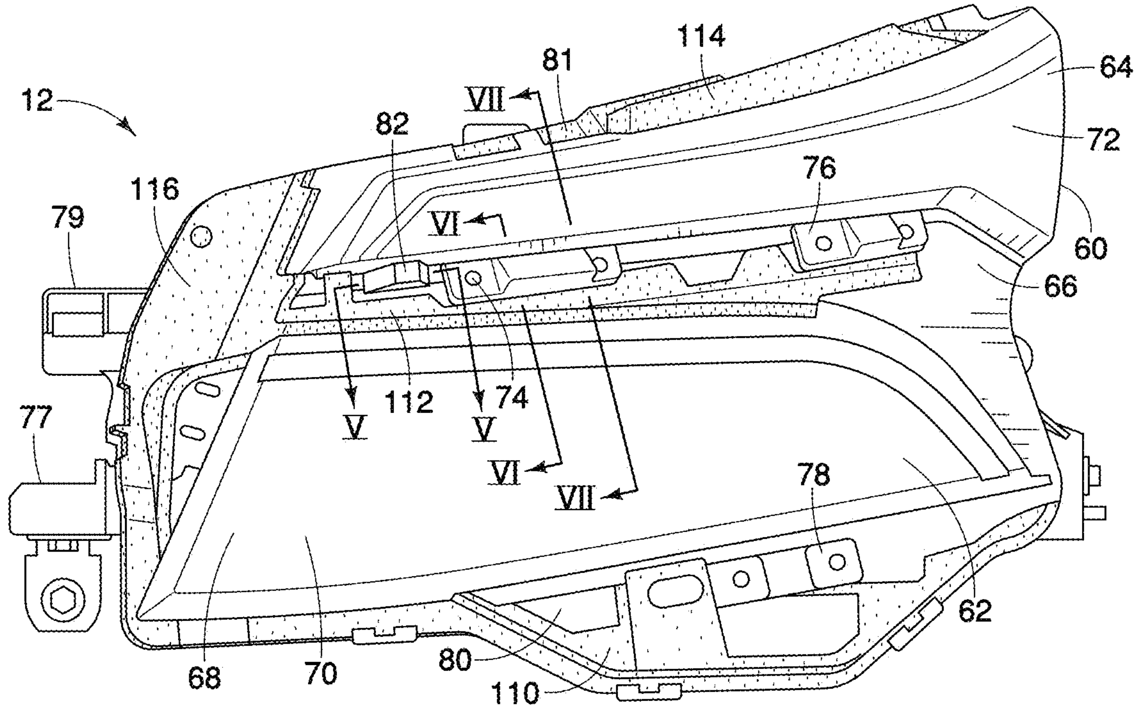
FIG. 4 is a front plan view of the driver side headlamp assembly illustrated in FIG. 1.

FIGS. 4 to 9 show the headlamp assembly 12 in more detail. The headlamp assembly 12 generally includes a headlamp housing 60 having a first side 62 and a second side 64. In FIG. 4, the first side 62 is the lower side of the headlamp housing 60, and the second side 64 is the upper side of the headlamp housing 60. As discussed in more detail below, the first side 62 houses a first lamp or lamp assembly 63 (hereinafter referred to as the first lamp 63), and the second side 64 houses a second lamp or lamp assembly 65 (hereinafter referred to as the second lamp 65). The construction and positioning of the front bumper 30 and the headlamp assembly 12 gives the appearance of two separate headlamp structures even though the first lamp 63 and the second lamp 65 are located within the same headlamp housing 60.

Figure 10:
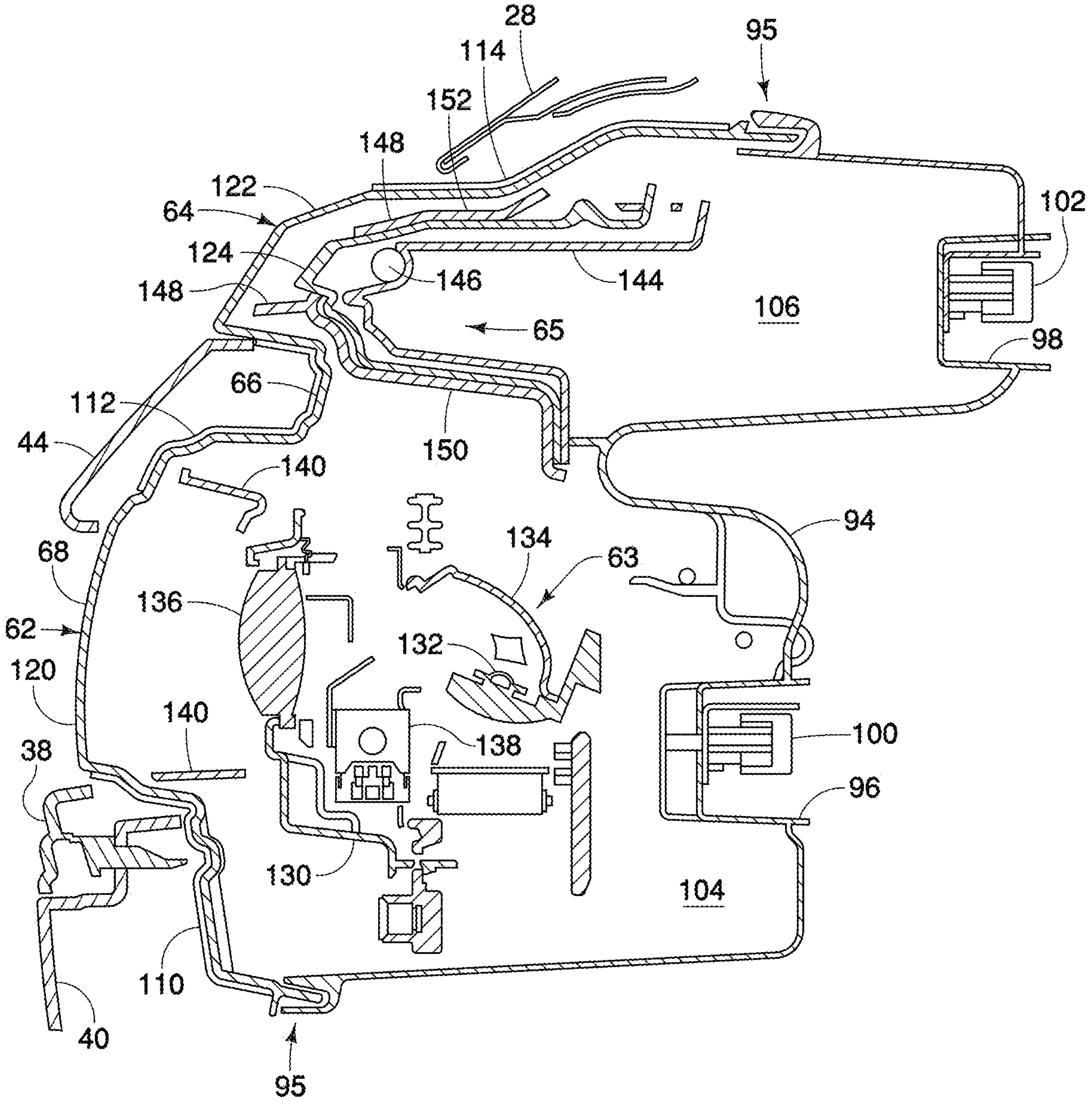
FIG. 10 is a cross-sectional view taken across lines X-X in FIG. 9.

As seen in FIGS. 4, 6 to 8 and 10, the headlamp housing 60 includes a cavity 66 between the first side 62 and the second side 64. More specifically, the headlamp housing 60 includes a front or outer lens surface 68, and the cavity 66 is a concave portion in the front outer lens surface 68. As best seen in FIG. 10, the outer lens surface 68 is a continuous surface across the front of the first side 62, the cavity 66, and the front of the second side 64. The cavity 66 is thus a laterally extending indentation separating a first exposed part 70 of the outer lens surface 68 on the first side 62 from a second exposed part 72 of the outer lens surface 68 on the second side 64. As seen in FIG. 9, the first exposed part 70 on the first side 62 is exposed within the aperture 42 to give the appearance of a first headlamp when the front bumper 30 is attached to the headlamp assembly 12, and the second exposed part 72 on the second side 64 is exposed above the overlay strip 44 and gives the appearance of a second headlamp when the bumper 30 is attached to the headlamp assembly 12.

As further seen in FIG. 4, the headlamp assembly 12 includes at least one bracket 74, 76, 78. At least one bracket 74, 76 is attached within the cavity 66 between the first side 62 and the second side 64 of the headlamp housing 60. More specifically, a first bracket 74 and a second bracket 76 are attached within the cavity 66. The first bracket 74 and the second bracket 76 are laterally adjacent and spaced apart from each other within the cavity 66. A third bracket 78 is also attached on an edge of the headlamp housing 60, namely, on a recessed portion 80 of the outer lens surface 68 at the bottom edge of the first side 62. The front bumper 30 is attached to the at least one bracket 74, 76, 78 such that the first lamp 63 emits light through the aperture 42 and the second lamp 65 emits light from an area outside of the aperture 42, as seen in FIGS. 1, 2 and 9. In an embodiment, at least one bracket 74, 76, 78 is integrally formed as part of the outer lens surface 68 of the headlamp housing 60. For example, one or more bracket 74, 76, 78 can be formed as a protrusion extending forward from the outer lens surface 68.

In the illustrated embodiment, the front bumper 30 snap fits into the at least one bracket 74, 76, 78. More specifically, the overlay strip 44 snap fits into the at least one bracket 74, 76, 78. The front bumper 30 can also attach to the at least one bracket 74, 76, 78 via other mechanisms such as bolts, screws or otherwise. By connecting the front bumper 30 and the headlamp assembly 12 as described herein, the overlap strip 44 at least partially prevents the headlamp assembly 12 from moving in a forward direction of the vehicle 10 and at least partially prevents the bumper 30 from sagging off of the vehicle frame 14 in the forward direction.

Figure 5:
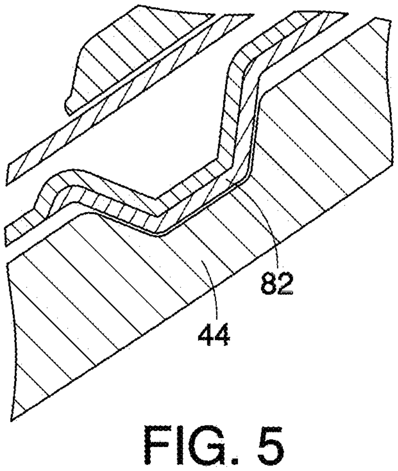
FIG. 5 is a cross-sectional view taken across lines V-V in FIG. 4.

FIG. 5 illustrates a portion of the overlay strip 44 attaching to the headlamp housing 60 within the cavity 66. In the illustrated embodiment, the headlamp housing 60 includes a rib 82 which protrudes outwardly from within the cavity 66. The overlay strip 44 includes a corresponding indention which aligns with the rib 82. The rib 82 and corresponding indentation assist with positioning when the front bumper 30 is attached to the headlamp housing 60 and also prevent the front bumper 30 from shifting laterally out of position.

Figure 6:
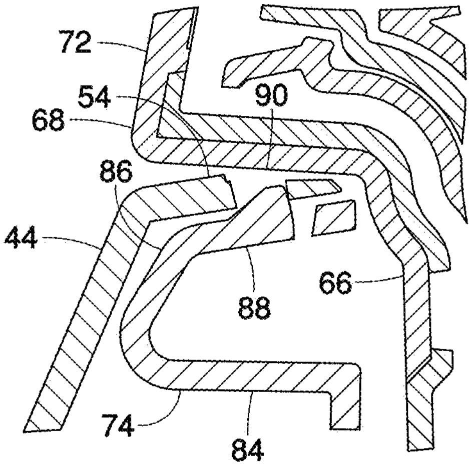
FIG. 6 is a cross-sectional view taken across lines VI-VI in FIG. 4.
Figure 7:
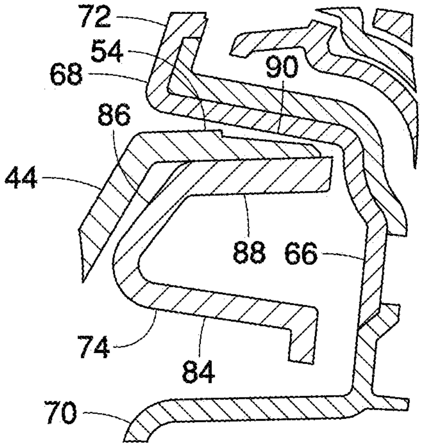
FIG. 7 is a cross-sectional view taken across lines VII-VII in FIG. 4.

FIGS. 6 and 7 further illustrate how the overlay strip 44 attaches to the bracket 74 located within the cavity 66. In the illustrated embodiment, the overlay strip 44 snap fits into the headlamp housing 60. The bracket 74 has a U-shaped side profile with a bottom portion 84, a middle portion 86 and an upper portion 88. The middle portion 86 bulges outward from within the cavity 66 between the first exposed part 70 of the first side 62 and the second exposed part 72 of the second side 64, forming a space between the upper portion 88 of the bracket 74 and an inner edge portion 90 of the cavity 66. The upper edge 54 of the overlay strip 44 fits into the space to attach the front bumper 30 to the headlamp housing 60. For example, the upper edge 54 of the overlay strip 44 extends into the space and snap fits into the upper portion 88 of the bracket 74 and/or into the inner edge portion 90 of the cavity 66. In the illustrated embodiment, the front bumper 30 is attached to both the first bracket 74 and the second bracket 76 in this manner. The front bumper 30 can also be attached to the third bracket 78 in a similar manner. Alternatively or additionally, the front bumper 30 can be attached below the bottom portion 84.

Figure 8:
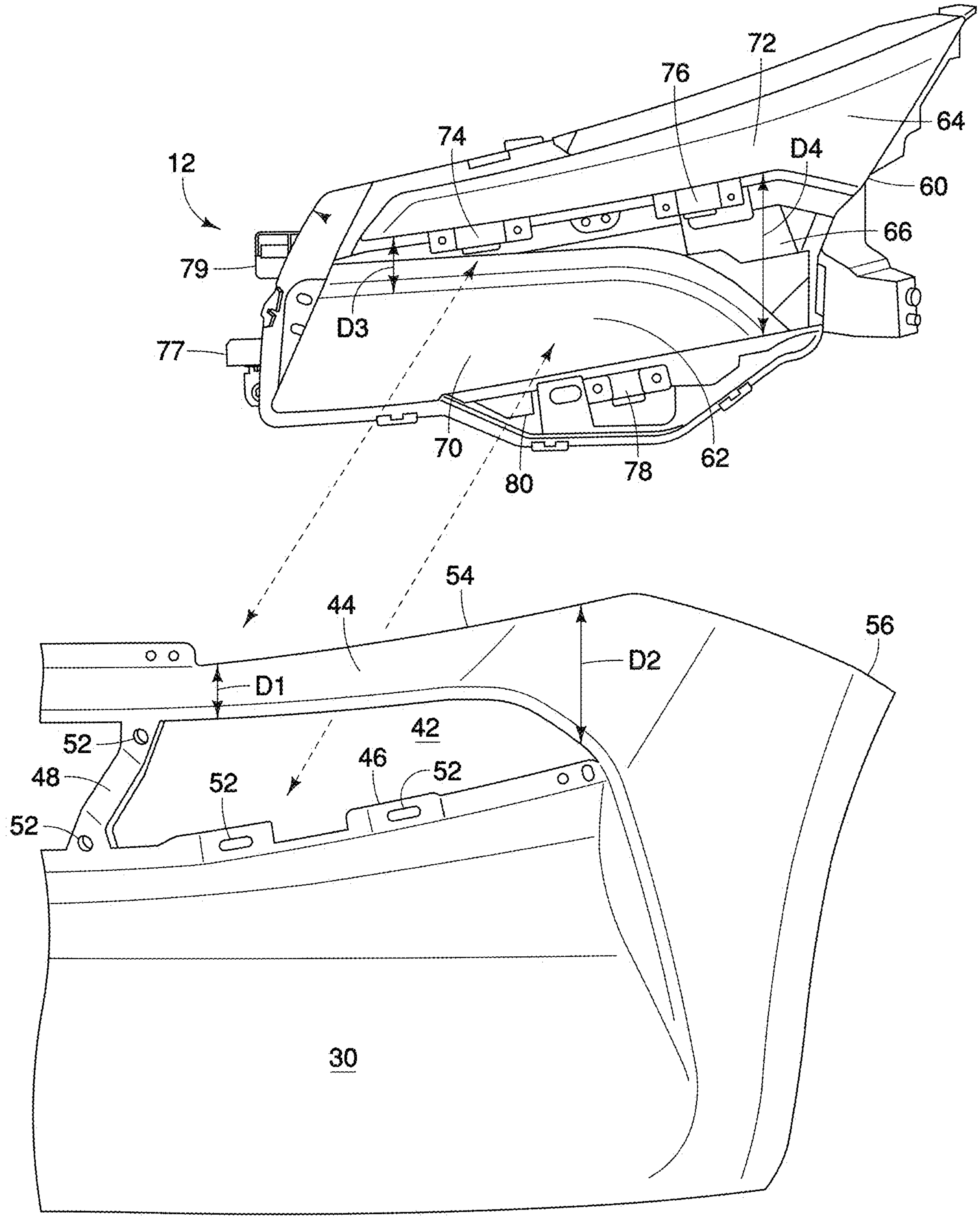
FIG. 8 is an exploded view of the front bumper and driver side headlamp assembly illustrated in FIG. 1.

FIG. 8 illustrates how the front bumper 30 attaches to the headlamp assembly 12 such that the first side 62 is located within the aperture 42 and the second side 64 is located above the overlay strip 44. In the illustrated embodiment, the inner side of the overlay strip 44 extends a vertical distance D1 and the outer side of the overlay strip 44 extends a larger vertical distance D2. Similarly, the inner side of the cavity 66 extends a vertical distance D3 and the outer side of the cavity 66 extends a larger vertical distance D4. The distance D1 generally corresponds to the distance D3, and the distance D2 generally corresponds to the distance D4, such that the overlap strip 44 is sized and positioned for a relatively snug fit within the cavity 66 to give the appearance of two headlamp structures from outside the front bumper 30.

As further seen in FIG. 8, the headlamp assembly 12 fits into the front bumper 30 such that the first exposed part 70 of the first side 62 extends into the aperture 42 to be exposed from the front side 20 of the vehicle 10. The second exposed part 72 of the second side 64 is then located above the aperture 42 and overlay strip 44 and exposed from the front side 20 of the vehicle 10. The apertures 52 of the first edge 46 can attach to corresponding features or apertures on the recessed portion 80 at the bottom edge of the first side 62, and the apertures 52 on the second edge 48 can attach to corresponding features or apertures on the inner extensions 77, 79 on the inner side of the headlamp housing 60. The upper edge 54 of the overlay strip 44 also aligns with and attaches to the brackets 74, 76 as discussed above.

FIG. 9 illustrates the bumper 30 attached to the headlamp assembly 12 with the overlay strip 44 placed over the headlamp assembly 12. The overlay strip 44 is attached to and located within the cavity 66 in the headlamp housing 60, which creates the look of two separate headlamp structures even though the headlamp assembly 12 is a singular structure containing both the first lamp 63 and the second lamp 65. The first exposed part 70 of the outer lens surface 68 is located within the aperture 42 and appears as a first headlamp. The second exposed part 72 of the outer lens surface 68 is located above the overlap strip 44 and appears as the second headlamp. The first exposed part 70 is bordered by the bumper 30 on all sides, including by the overlay strip 44 on the upper side. The second exposed part 72 is bordered by the overlay strip 44 on the bottom side, by the front hood 28 on the upper side, and by the front driver side panel 32 on the driver side 22 (or the front passenger side panel 34 for the headlamp assembly 12 on the passenger side 24). The first exposed part 70 of the first part 62 is exposed to the front side 20 of the vehicle 12 through the aperture 42, and the second exposed part 72 of the second side 64 is exposed between the overlay strip 44, the bumper 28 and the front driver side panel 32 (or the front passenger side panel 34).

FIG. 10 illustrates the components of the headlamp assembly 12 located within and attached to the headlamp housing 60, as well as the relative positioning of the bumper 30 against the headlamp housing 60. In FIG. 10, the outer lens surface 68 of the headlamp housing 60 is shown on the left, and the rear surface 94 of the headlamp housing 60 is shown on the right.

In the illustrated embodiment, the outer lens surface 68 and the rear surface 94 attach to each other to create the single structure of the headlamp assembly 12. That is, the outer lens surface 68 is a continuous single surface forming the front side shell of the headlamp housing 60, and the rear surface 94 is a continuous single surface forming the rear side shell of the headlamp housing 60. As seen in FIG. 10, the outer lens surface 68 and the rear surface 94 can include one or more corresponding connectors 95 that are shaped and oriented to removably or permanently attach the outer lens surface 68 to the rear surface 94 around the inner components of the headlamp assembly 12. In the illustrated embodiment, the outer lens surface 68 includes one or more protrusions that snap fit into one or more cavities of the rear surface 94. The outer lens surface 68 can attach to the rear surface 94, for example, by snap fit, bolts, screws or other attachment mechanisms.

In the illustrated embodiment, the rear surface 94 includes a first outer cavity 96 at the first side 62 of the headlamp housing 60 and a second outer cavity 98 at the second side 64 of the headlamp housing 60. The first cavity 96 receives a first mechanical and/or electrical connector 100 for mechanically and/or electrically connecting the first side 62 of the headlamp housing 60 to the vehicle frame 14, and the second cavity 98 receives a second mechanical and/or electrical connector 102 for mechanically and/or electrically connecting the second side 64 of the headlamp housing 60 to the vehicle frame 14. In an embodiment, the single structure of the headlamp assembly 12 enables the first lamp 63 and the second lamp 65 to receive power via the same mechanism.

As seen in FIG. 10, the headlamp assembly 12 includes a first inner lamp cavity 104 on the first side 62 and a second inner lamp cavity 106 on the second side 64. In other words, the first inner lamp cavity 104 is located within the lower side of the headlamp housing 60, and the second inner lamp cavity 106 is located within the upper side of the headlamp housing 60. The first side 62 of the headlamp assembly 12 houses the first lamp 63 in the first lamp cavity 104. The second side 64 of the headlamp assembly 12 houses the second lamp 65 in the second lamp cavity 106. The headlamp housing 60 having two inner cavities 104, 106 thus contributes to the appearance of two separate lamp structures from outside the vehicle 10, with the first lamp 63 below the overlay strip 44 appearing as one lamp structure and the second lamp 65 above the overlay strip 44 appearing as a second lamp structure, as seen in FIGS. 1, 2 and 9.

In the illustrated embodiment, the headlamp assembly 12 includes at least one blackout layer 110, 112, 114, 116 to prevent noticeable light leaks between the first side 62 and the second side 64 and to further contribute to the appearance of two separate headlamps on each side of the front bumper 30. The blackout layers 110, 112, 114, 116 are generally opaque to prevent light from passing therethrough. As seen in FIGS. 4 and 10, the illustrated headlamp assembly 12 includes a first blackout layer 110, a second blackout layer 112, a third blackout layer 114 and a fourth blackout layer 116. The blackout layers 110, 112, 114, 116 are shaded in FIG. 4 to illustrate placement on the headlamp housing 60. The first blackout layer 110 is located on the lower lip 80 of the outer lens surface 68 and prevents a light leak from the lower part of the first side 62 of the headlamp housing 60. The second blackout layer 112 is located within the cavity 66 between the first side 62 and the second side 64 to at least partially prevent a light leak from the first lamp 63 into the second side 64 and the second lamp 65 into the first side 62. The third blackout layer 114 is located on an upper lip 81 of the outer lens surface 68 and prevents a light leak from the upper part of the second side 64 of the headlamp housing 60. The fourth blackout layer 116 is located on the inner side of the headlamp housing 60 (see FIG. 4). In the illustrated embodiment, the blackout layer 110, 112, 114, 116 are located on the outer surface of the headlamp housing 60, but the blackout layers 110, 112, 114, 116 can also be located inside the headlamp housing 60.

In the illustrated embodiment, the outer lens surface 68 of the headlamp housing 60 is a generally transparent surface through which light can pass, and the blackout layers 110, 112, 114, 116 are opaque surfaces attached over certain portions of the transparent surface to limit or prevent light from passing through that portion. The blackout layers 110, 112, 114, 116 can be any color, substance or structure that provides the blackout effect of limiting or preventing light leaks as described herein.

In an alternative embodiment, the blackout layers 110, 112, 114 can be applied to the clear/transparent surfaces as a paint or other substance that creates an opaque surface when it dries. For example, the first blackout layer 110 can be applied over the outer lens surface 68 at the lower lip 80, the second blackout layer 112 can be applied over the outer lens surface 68 at the cavity 66, the third blackout layer 114 can be applied over the outer lens surface 68 at the upper lip 81, the fourth blackout layer 116 can be applied on the inner side of the headlamp housing 60.

In the illustrated embodiment, the headlamp assembly 12 includes one or more transparent lens 120, 122, 124 enabling light from the first lamp 63 or the second lamp 65 to be emitted, respectively, from the first side 62 and the second side 64 of the headlamp housing 60 to be seen in front of the vehicle 10. The transparent lenses 120, 122, 124 are generally transparent to enable light therethrough. In the illustrated embodiment, the transparent lenses 120, 122, 124 are clear, but the transparent lenses 120, 122, 124 can include a colored or tinted surface that is transparent enough for light to emit therethrough and/or that changes the color of the light.

In the illustrated embodiment, the headlamp assembly 12 includes a first transparent lens 120, a second transparent lens 122 and a third transparent lens 124. The first transparent lens 120 forms the first exposed part 70 on the lower side of the outer lens surface 68 and enables light from the first lamp 63 to pass therethrough. The second transparent lens 122 forms the second exposed part 72 on the upper side of outer lens surface 68 and enables light from the second lamp 65 to pass therethrough. The first transparent lens 120 and the second transparent lens 122 thus contribute to the appearance of two separate headlamps on each side of the front bumper 30. The third transparent lens 124 is located in the second cavity 106 as part of the second lamp 65 and focusses the light from the second lamp 65 toward the second transparent lens 122.

The first lamp 63 and the second lamp 65 can each include a light, one or more mounting structures to mount the light, and/or one or more reflecting or directing surfaces to reflect and/or direct light through the intended transparent lenses 120, 122, 124 of the headlamp assembly 12. In the illustrated embodiment, the first lamp 63 emits light from the first side 62 of the headlamp housing 60 via photoelectric scanner (PES) unit, and the second lamp 65 emits light from the second side 64 of the headlamp housing 60 via a light pipe, but those of ordinary skill in the art will recognize from this disclosure that other structures can be implemented within the headlamp housing 60.

As seen in FIG. 10, the illustrated first lamp 63 generally includes a photoelectric scanner (PES) unit. More specifically, the illustrated first lamp 63 includes a mounting structure 130, a light 132, a reflector 134, a transparent lens 136, a control unit 138, and a blackout bezel 140. The illustrated light 132 is an LED light, but other types of lights can also be used. The mounting structure 130 mounts and orients the light 132 so that light from the light 132 is reflected off of the reflector 134 and through the inner transparent lens 136 towards the outer transparent lens 120. The blackout bezel 140 includes an opaque surface and prevents light leaks between the inner transparent lens 136 and the outer transparent lens 120. The control unit 138 controls the first lamp 63 in accordance with instructions from the vehicle 10 and/or the driver.

As also seen in FIG. 10, the illustrated second lamp 65 includes the transparent lens 124, a mounting structure 144, a light 146, and a blackout bezel 148. In the illustrated embodiment, the light 146 includes a light pipe mounted in a light cavity between the mounting structure 144 and the inner transparent lens 124. The blackout bezel 148 encircles the inner transparent lens 124 such that light is focused through the transparent lens 124 towards the outer transparent lens 122 and is prevented from leaking into another part of the headlamp assembly 12. The bottom surface 150 of the blackout bezel 148 is further positioned and arranged to at least partially separate the first inner lamp cavity 104 from the second inner lamp cavity 106 and prevent a light leak from the second lamp 65 into the first side 62 and from the first lamp 63 into the second side 64. In an embodiment, the bottom surface 150 can be separate from the blackout bezel and form an intermediate structure or wall separating the first cavity 104 from the second cavity 106.

In an embodiment, the first lamp 63 and/or the second lamp 65 can include various types of lights or other structures in addition to or instead of the structures shown, for example, an LED light, a Xenon light, a laser, and/or a reflector or projector lens to direct the light beam with optimal illumination of the road ahead. The lamps 63, 65 can also include, for example, a daytime running lamp, a parking lamp, a turn signal lamp, a fog lamp or another type of lamp.

Referring again to FIGS. 1 and 2, the vehicle 10 is illustrated with two headlamp assemblies 12*a*, 12*b*. The first headlamp assembly 12*a* includes a first lamp 63 and a second lamp 65 as discussed above. The second headlamp assembly 12*b* includes a third lamp (e.g., another first lamp 63) and a fourth lamp (e.g., another second lamp 65) as discussed above. The front bumper 30 is located on the front side 20 of the vehicle frame 14. The front bumper 30 includes a first aperture 42*a* with a border formed by a first overlay strip 44*a* and a second aperture 42*b* with a border formed by a second overlay strip 44*a*. The front bumper 30 is attached (e.g., directly or indirectly) to the vehicle frame 14 over the headlamp assemblies 12*a*, 12*b* such that the first lamp 63 emits light through the first aperture 42*a*, the second lamp 65 emits light from above the first aperture 42*a*, the third lamp (e.g., another first lamp 63) emits light through the second aperture 42*b*, and the fourth lamp (e.g., another second lamp 65) emits light from above the second aperture 42*b*.

The first headlamp assembly 12*a* and the second headlamp assembly 12*b* shown in FIGS. 1 and 2 are constructed as discussed above. As described herein, the first headlamp assembly 12 is a single structure and has a lower side housing a first lamp 63 and an upper side housing a second lamp 65, and the second headlamp assembly 12*b* is also a single structure and has a lower side housing a first lamp 63 and an upper side housing a second lamp 65. The first headlamp assembly 12 includes a first cavity 66 between the upper side and the lower side, and the second headlamp assembly 12 includes a second cavity 66 between the upper side and the lower side.

The first overlay strip 44*a* shown in FIGS. 1 and 2 overlaps a portion of the first headlamp assembly 12*a* between the upper side and the lower side, and the second overlay strip 44*b* overlaps a portion of the second headlamp assembly 12*b* between the upper side and the lower side. The first overlay strip 44*a* is located within the first cavity 66 of the first headlamp assembly 12*a*, and the second overlay strip 44*b* is located within the second cavity 66 of the second headlamp assembly 12*b*. The first overlap strip 44*a* at least partially prevents the first headlamp assembly 12*a* from moving in a forward direction of the vehicle 10, and the second overlap strip 44*b* at least partially prevents the second headlamp assembly 12*b* from moving in the forward direction of the vehicle 10. The first headlamp assembly 12*a* includes a blackout layer 112 (or 150) between the upper side and the lower side to at least partially prevent a light leak from the first lamp 63 into the lower side and the second lamp 65 into the upper side. The second headlamp assembly 12*b* also includes a blackout layer 112 (or 150) between the upper side and the lower side to at least partially prevent a light leak from the third lamp 63 into the lower side and the fourth lamp 65 into the upper side.

In the illustrated embodiment, the front bumper 30 includes two apertures 42, with one aperture 42*a* on the driver side 22 and another aperture 42*b* on the passenger side 24. In an alternative embodiment, the front bumper 30 can include additional apertures 42. For example, the front bumper 30 can be formed with two apertures 42 separated by an overlay strip 44 on each of the driver side 22 and the passenger side 24. One of the apertures 42 (e.g., the lower aperture on each side) can receive the first side 62 of a respective headlamp assembly 12, and the other of the apertures 42 (e.g., the upper aperture on each side) can receive the second side 64 of the respective headlamp assembly 12.

The embodiments described herein provide improved bumper and headlamp assemblies for vehicles. These systems are advantageous, for example, because they reduce the number of parts and limit or prevent the front bumper from sagging. It should be understood that various changes and modifications to the systems and methods described herein will be apparent to those skilled in the art and can be made without diminishing the intended advantages.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts.

The term "configured" as used herein to describe a component, section or part of a device includes hardware and/or software that is constructed and/or programmed to carry out the desired function.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle comprising:

a vehicle frame having a front side extending from a driver side to a passenger side;

a headlamp assembly located on the front side of the vehicle frame, the headlamp assembly being a single structure located on the driver side or the passenger side of the front side and having a first side housing a first lamp and a second side housing a second lamp; and a front bumper located on the front side of the vehicle frame, the front bumper including at least a first aperture with a border formed by an overlay strip, the front bumper attached over the headlamp assembly so that the first lamp emits light through the first aperture on one side of the overlay strip, the second lamp emits light on another side of the overlay strip, and the overlay strip overlaps a portion of the headlamp assembly between the first side and the second side, the headlamp assembly including a blackout layer between the first side and the second side to at least partially prevent a light leak from the first lamp into the second side and the second lamp into the first side.

2. The vehicle of claim 1, wherein
the overlap strip at least partially prevents the headlamp assembly from moving in a forward direction of the vehicle.

3. The vehicle of claim 1, wherein
the headlamp assembly includes a cavity between the first side and the second side, and
the overlay strip is located within the cavity.

4. The vehicle of claim 1, wherein
the headlamp assembly includes a first lamp cavity on the first side and a second lamp cavity on the second side,
the first lamp is located in the first lamp cavity, and
the second lamp is located in the second lamp cavity.

5. The vehicle of claim 1, wherein
the overlay strip snap fits into the headlamp assembly.

6. The vehicle of claim 1, wherein
the first side is a lower side of the headlamp assembly, and
the second side is an upper side of the headlamp assembly.

7. The vehicle of claim 1, wherein
the headlamp assembly includes an outer lens surface that is a transparent surface creating a first transparent lens for the first lamp on the first side and a second transparent lens for the second lamp on the second side.

8. The vehicle of claim 1, wherein
the first side and the second side of the headlamp housing overlap vertically.

9. A vehicle comprising:
a vehicle frame having a front side extending from a driver side to a passenger side;
a headlamp assembly located on the front side of the vehicle frame, the headlamp assembly being a single structure located on the driver side or the passenger side of the front side and having a first side housing a first lamp and a second side housing a second lamp;
a front bumper located on the front side of the vehicle frame, the front bumper including at least a first aperture with a border formed by an overlay strip, the front bumper attached over the headlamp assembly so that the first lamp emits light through the first aperture on one side of the overlay strip, the second lamp emits light on another side of the overlay strip, and the overlay strip overlaps a portion of the headlamp assembly between the first side and the second side,
the headlamp assembly including a cavity between the first side and the second side, the overlay strip located within the cavity, the cavity is being a laterally extending indentation separating a first exposed part of the headlamp assembly on the first side and a second exposed part of the headlamp assembly on the second side.

10. A vehicle comprising:
a vehicle frame having a front side extending from a driver side to a passenger side;
a headlamp assembly located on the front side of the vehicle frame, the headlamp assembly being a single structure located on the driver side or the passenger side of the front side and having a first side housing a first lamp and a second side housing a second lamp; and
a front bumper located on the front side of the vehicle frame, the front bumper including at least a first aperture with a border formed by an overlay strip, the front bumper attached over the headlamp assembly so that the first lamp emits light through the first aperture on one side of the overlay strip, the second lamp emits light on another side of the overlay strip, and the overlay strip overlaps a portion of the headlamp assembly between the first side and the second side,
the headlamp assembly including a cavity between the first side and the second side, the overlay strip located within the cavity, and
the headlamp assembly including an outer lens surface that is a continuous surface across the first side, the cavity, and the second side.

11. A vehicle comprising:
a vehicle frame having a front side extending from a driver side to a passenger side;
a headlamp assembly located on the front side of the vehicle frame, the headlamp assembly being a single structure located on the driver side or the passenger side of the front side and having a first side housing a first lamp and a second side housing a second lamp; and
a front bumper located on the front side of the vehicle frame, the front bumper including at least a first aperture with a border formed by an overlay strip, the front bumper attached over the headlamp assembly so that the first lamp emits light through the first aperture on one side of the overlay strip, the second lamp emits light on another side of the overlay strip, and the overlay strip overlaps a portion of the headlamp assembly between the first side and the second side,
the headlamp assembly including a cavity between the first side and the second side, the overlay strip located within the cavity, and
at least one bracket attached to the headlamp assembly within the cavity, the front bumper attached to the at least one bracket.

12. The vehicle of claim 11, wherein
the front bumper snap fits into the at least one bracket.

13. The vehicle of claim 11, wherein
the headlamp assembly has a continuous outer lens surface extending from the first side to the second side, and
the at least one bracket is formed as part of the outer lens surface.

14. A vehicle comprising:
a vehicle frame having a front side extending from a driver side to a passenger side;
a headlamp assembly located on the front side of the vehicle frame, the headlamp assembly being a single structure located on the driver side or the passenger side of the front side and having a first side housing a first lamp and a second side housing a second lamp;
a front bumper located on the front side of the vehicle frame, the front bumper including at least a first aperture with a border formed by an overlay strip, the front bumper attached over the headlamp assembly so that the first lamp emits light through the first aperture on one side of the overlay strip, the second lamp emits light on another side of the overlay strip, and the overlay strip overlaps a portion of the headlamp assembly between the first side and the second side;
a first bracket attached to the headlamp assembly between the first side and the second side; and
a second bracket attached on an edge of the headlamp assembly,
the front bumper attached to both the first bracket and the second bracket.

15. A vehicle comprising:
a vehicle frame having a front side extending from a driver side to a passenger side;
a headlamp assembly located on the front side of the vehicle frame, the headlamp assembly being a single structure located on the driver side or the passenger side of the front side and having a first side housing a first lamp and a second side housing a second lamp; and a front bumper located on the front side of the vehicle frame, the front bumper including at least a first aperture with a border formed by an overlay strip, the front bumper attached over the headlamp assembly so that the first lamp emits light through the first aperture on one side of the overlay strip, the second lamp emits light on another side of the overlay strip, and the overlay strip overlaps a portion of the headlamp assembly between the first side and the second side, the headlamp assembly including at least one blackout layer attached to an outer lens surface of the headlamp housing.

16. The vehicle of claim 15, wherein the overlay strip overlaps the at least one blackout layer.

17. A vehicle comprising:

a vehicle frame having a front side extending from a driver side to a passenger side;

a headlamp assembly located on the front side of the vehicle frame, the headlamp assembly being a single structure located on the driver side or the passenger side of the front side and having a first side housing a first lamp and a second side housing a second lamp; and a front bumper located on the front side of the vehicle frame, the front bumper including at least a first aperture with a border formed by an overlay strip, the front bumper attached over the headlamp assembly so that the first lamp emits light through the first aperture on one side of the overlay strip, the second lamp emits light on another side of the overlay strip, and the overlay strip overlaps a portion of the headlamp assembly between the first side and the second side, the headlamp assembly including a first inner lamp cavity housing the first lamp on the first side and a second inner lamp cavity housing the second lamp on the second side, and the headlamp assembly including at least one blackout layer located within the headlamp assembly so as to at least partially separate the first inner lamp cavity and the second inner lamp cavity.

18. A vehicle comprising:

a vehicle frame having a front side extending from a driver side to a passenger side;

a first headlamp assembly located on the front side of the vehicle frame, the first headlamp assembly being a single structure located on the driver side or the passenger side of the front side and having a first side housing a first lamp and a second side housing a second lamp;

a second headlamp assembly located on the front side of the vehicle frame, the second headlamp assembly being a single structure located on an opposite of the driver side or the passenger side from the first headlamp assembly and having a third side housing a third lamp and a fourth side housing a fourth lamp; and a front bumper located on the front side of the vehicle frame, the front bumper including a first aperture with a border formed by a first overlay strip, the front bumper attached over the first headlamp assembly so that the first lamp emits light through the first aperture on one side of the first overlay strip, the second lamp emits light on another side of the first overlay strip, and the first overlay strip overlaps a portion of the first headlamp assembly between the first side and the second side, the front bumper further including a second aperture with a border formed by a second overlay strip, the front bumper attached over the second headlamp assembly so that the third lamp emits light through the second aperture on one side of the second overlay strip, the fourth lamp emits light on another side of the second overlay strip, and the second overlay strip overlaps a portion of the second headlamp assembly between the third side and the fourth side.

19. The vehicle of claim 18, wherein the headlamp assembly includes a blackout layer between the first side and the second side to at least partially prevent a light leak from the first lamp into the second side and the second lamp into the first side.

20. The vehicle of claim 18, wherein the first side and the second side of the first headlamp housing overlap vertically, and the third side and the fourth side of the second headlamp housing overlap vertically.

* * * * *